United States Patent
Bavar et al.

(10) Patent No.: US 11,399,664 B2
(45) Date of Patent: Aug. 2, 2022

(54) TONGS

(71) Applicant: Kaloud, Inc., Los Angeles, CA (US)

(72) Inventors: Reza Bavar, Los Angeles, CA (US); Skyler Olsen, Denver, CO (US)

(73) Assignee: Kaloud, Inc., Thousand Oaks, CA (US)

(*) Notice: Subject to any disclaimer, the term of this patent is extended or adjusted under 35 U.S.C. 154(b) by 288 days.

(21) Appl. No.: 16/855,146

(22) Filed: Apr. 22, 2020

(65) Prior Publication Data

US 2021/0298533 A1   Sep. 30, 2021

Related U.S. Application Data

(63) Continuation-in-part of application No. 29/729,170, filed on Mar. 24, 2020, now Pat. No. Des. 942,824.

(51) Int. Cl.
A47J 43/28 (2006.01)
A47J 37/07 (2006.01)

(52) U.S. Cl.
CPC ......... *A47J 43/283* (2013.01); *A47J 37/0786* (2013.01)

(58) Field of Classification Search
CPC .............. A47J 48/283; A47J 37/0786
USPC ....................................................... 294/99.2
See application file for complete search history.

(56) References Cited

U.S. PATENT DOCUMENTS

| | | | | |
|---|---|---|---|---|
| D205,630 S * | 8/1966 | Kremkau | ............... | D8/56 |
| 4,728,139 A * | 3/1988 | Oretti | ............... | A47J 43/283 294/99.2 |
| D313,537 S * | 1/1991 | Chisholm | ............... | D7/686 |
| 5,934,721 A * | 8/1999 | Walde | ............... | A47J 43/283 294/7 |
| 6,056,338 A * | 5/2000 | Kerr | ............... | A47G 21/10 294/99.2 |
| D509,413 S * | 9/2005 | Marsden | ............... | D7/686 |
| D518,687 S * | 4/2006 | Baker | ............... | D7/686 |
| 8,459,708 B1 * | 6/2013 | Sandorfi | ............... | A47J 43/283 294/99.2 |
| D774,857 S * | 12/2016 | Pendock | ............... | D8/52 |
| 10,076,212 B2 * | 9/2018 | Ulseth | ............... | A47J 43/288 |
| D942,824 S * | 2/2022 | Bavar | ............... | D7/686 |
| 2013/0049387 A1 * | 2/2013 | Lv | ............... | A47J 43/283 74/527 |
| 2019/0261680 A1 | 8/2019 | Bavar | | |

\* cited by examiner

*Primary Examiner* — Paul T Chin
(74) *Attorney, Agent, or Firm* — Myers Wolin, LLC

(57) ABSTRACT

Tongs are provided, where the tongs have a pair of tong arms each having a first end and a second end. Each tong arm comprises a substantially cylindrical hinge component at the first end formed from a structural material and a gripping component at the second end formed from the structural material. A handhold extends from the hinge component to the gripping component and is formed from a handhold material, and a substantially linear linking element extends from the hinge component to the gripping component of the corresponding tong arm. The linking element is formed from the structural material. The structural material is stronger than the handhold material, and the linking element is surrounded on at least three sides along its length by the handhold.

16 Claims, 6 Drawing Sheets

TONGS

CROSS REFERENCE TO RELATED APPLICATIONS

This application is a continuation in part of U.S. Design patent application No. 29/729,170, filed Mar. 24, 2020, the entire contents of which are incorporated by reference herein.

FIELD OF THE INVENTION

The invention relates to tongs for manipulating hot items, such as charcoal briquettes.

BACKGROUND

Tongs are commonly used for manipulating objects that would be difficult or impossible to manipulate by hand. Tongs may be used to manipulate objects that are too hot to touch, such as cooking food or charcoal briquettes during a cooking process. Such tongs may be designed, for example, for moving charcoal briquettes when using a hookah. Traditionally, tongs provide two arms with gripping tips. The two arms typically meet at a joint of some sort, and the gripping tips swivel relative to the joint such that they can meet to grasp the object being manipulated.

In some scenarios, the object being manipulated requires precision manipulation so as to, for example, place charcoal in a precise location. Such manipulation requires tongs strong enough to grip charcoal while comfortably grasping the tongs from a handle. Such precision generally requires a relatively small pair of tongs with a precisely calibrated joint.

Existing tongs often comprise a bent piece of metal, such that the two arms are really two ends of a single piece of metal, and the joint is a bend in that single piece. This construction results in tips that are effectively spring loaded such that they separate, but the tips do not meet precisely or consistently. The arms could therefore wobble during use and would provide quite a bit of play.

Other existing tongs provide two distinct arms, typically made of metal, that are joined at a spring loaded joint. Such a spring loaded joint would typically result in arms that wobble relative to each other and connect at inconsistent angles. Further, such spring loaded joints would occasionally stick at a closed position.

Further, existing tongs are typically made of a metal or other material that is strong enough to grasp the object being manipulated. In the case of small tongs, this often results in the tongs becoming hot when manipulating a hot object, and the tongs being forced to assume the look and feel of a material strong enough and durable enough to handle hot objects.

Some existing products apply heat shields to the arms of tongs. However, such heat shields are visibly conspicuous and do not form a coherent aesthetic for the tongs. Further, such heat shields are designed to protect a user from heat, but are not typically designed to provide a premium feel or aesthetic. Some tongs have attempted to substitute a material with a premium look or feel for a segment of tong arms between a tip and the hinge, but such tongs result in poor connections between materials and tongs that are not sufficiently strong or durable for use.

In order to provide tongs that are durable and provide a premium feel for use in manipulating charcoal, there is a need for tongs that combine a smooth joint with minimal lateral play with a handle with a premium feel and structural components that are sufficiently strong and durable.

SUMMARY

Tongs are provided, where the tongs have a pair of tong arms each having a first end and a second end. Each tong arm comprises a substantially cylindrical hinge component at the first end formed from a structural material and a gripping component at the second end formed from the structural material. A handhold extends from the hinge component to the gripping component and is formed from a handhold material, and a substantially linear linking element extends from the hinge component to the gripping component of the corresponding tong arm.

The linking element is formed from the structural material. The structural material is stronger than the handhold material, and the linking element is surrounded on at least three sides along its length by the handhold. Typically, the linking element is exposed at an inner surface of the tong arm and is enclosed on side surfaces and a back surface by the handhold.

In some embodiments, the handhold is bonded to the linking element by an adhesive, and the linking element may be exposed at an inner surface of the corresponding arm. The inner surface of the linking element may be substantially planar and coextensive with an inner surface of the gripping component and an inner surface of the handhold.

In some embodiments, the back surface of the linking element is substantially planar other than a linear extension, and the linear extension is raised relative to the back surface, with the linear extension extending along the length of the linking element. In such an embodiment, the adhesive may be bonded to surfaces of the linear extension and/or the back surface and side surfaces of the linking element.

In some embodiments, the linear extension is offset from a center on the back surface of the linking element along the length of the linking element. In such an embodiment, the hinge components of each of the first and second arms may combine to form a cylindrical hinge, with each hinge component having an interface surface where it interfaces with the hinge component of the other of the first and second arms, and where the linking element of each arm is centered relative to a height of the cylindrical hinge, and wherein the linear extension is offset from the center of the back surface of the corresponding linking element such that the linear extension meets the corresponding hinge component adjacent the interface surface.

In some embodiments, the gripping component has an outer surface and a linear extension of the outer surface of the gripping component is tangent to the cylindrical surface of the corresponding hinge component. An outer surface of the handhold may then be substantially coplanar with the outer surface of the gripping component.

Typically, the hinge components of each of the first and second arms combine to form a cylindrical hinge. The cylindrical hinge may further comprise an internal surface within each hinge component perpendicular to a cylindrical wall of the corresponding hinge component, wherein, when assembled, the internal surfaces and cylindrical walls of the hinge components form an internal chamber within the cylindrical hinge. A biasing spring may be provided for biasing the gripping components away from each other, and a thrust bearing may be compressed between the internal surfaces for rotating the arms relative to each other.

Each hinge component may then be provided with a corresponding end cap formed from the handhold material, and the end caps may then form opposing bases of the cylindrical hinge when assembled. In some embodiments, the opposing bases of the cylindrical hinge are tapered towards the tong arms at an angle relative to a central plane of the tongs, and a width of each tong arm is tapered along a length of the corresponding tong arm at the same angle relative to the central plane, such that each tong arm forms a truncated wedge with the cylindrical hinge and with a point extending beyond the second end of the tong arm.

The structural material may have a lower thermal conductivity than the structural material and the structural material may be harder than the handhold material. In some embodiments, the structural material is metal and the handhold material is wood. In some such embodiments, the structural material may be anodized aluminum.

DETAILED DESCRIPTION OF THE PREFERRED EMBODIMENTS

Figure 1:
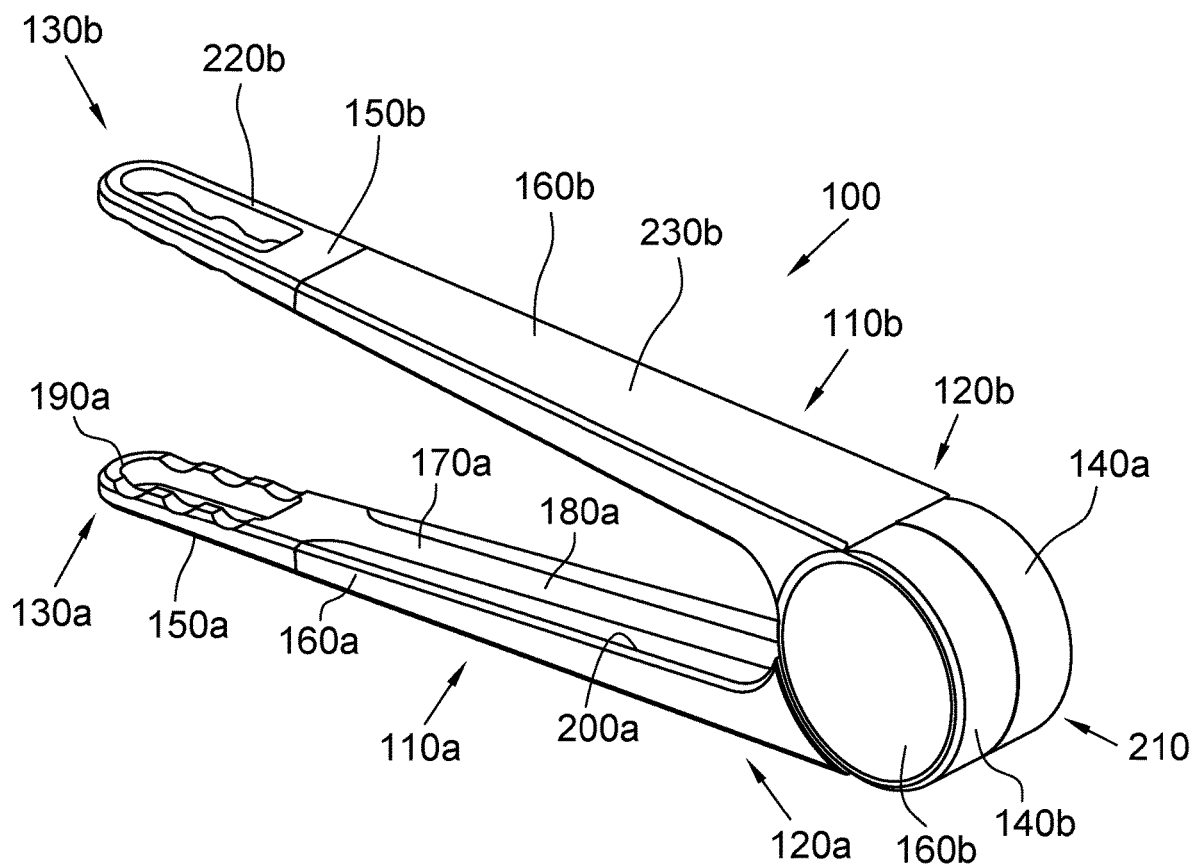
FIG. 1 is a perspective view of tongs in accordance with this disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
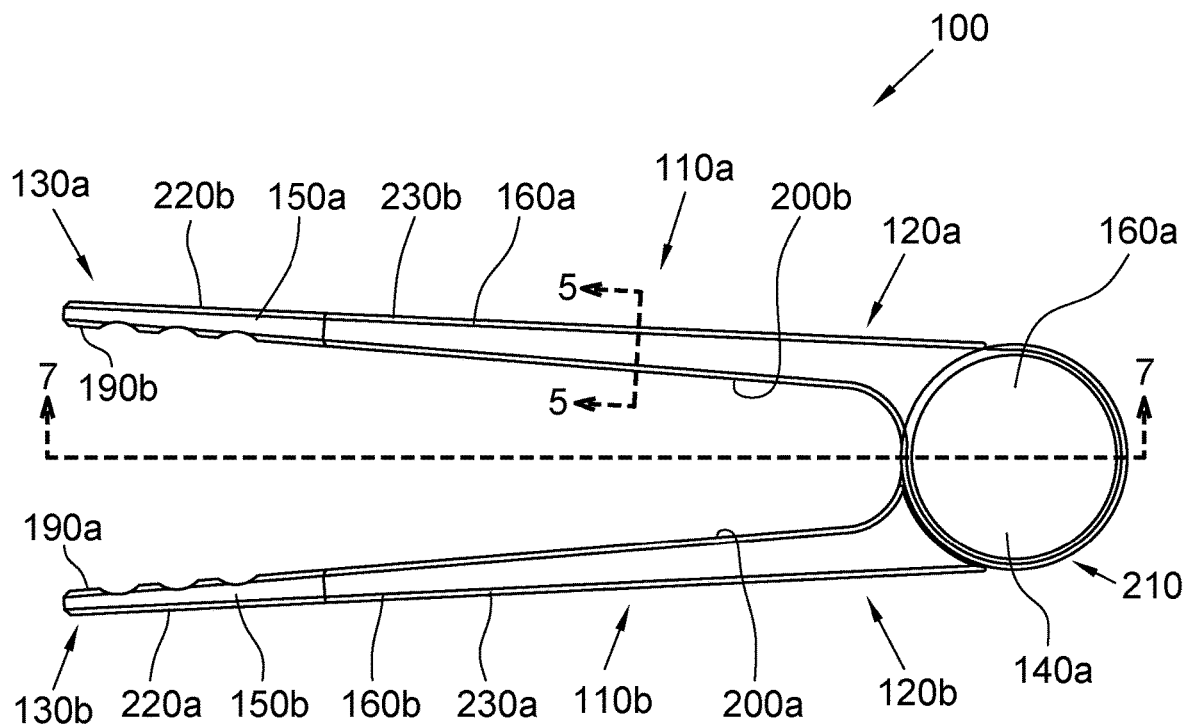
FIG. 2 is a top view of the tongs of FIG. 1.
Figure 3:
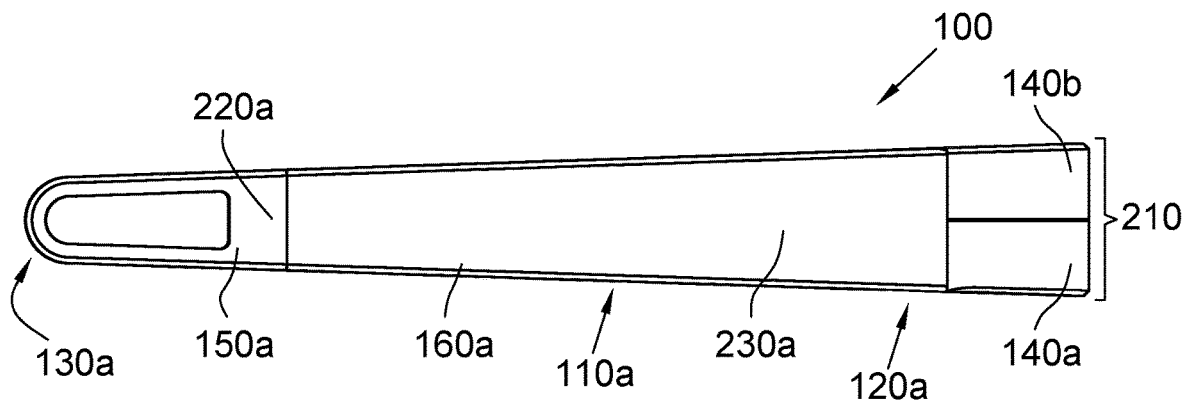
FIG. 3 is a side view of the tongs of FIG. 1.

FIG. 1 is a perspective view of tongs 100 in accordance with this disclosure. FIG. 2 is a top view and FIG. 3 is a side view of the tongs 100 of FIG. 1.

As shown, the tongs comprise a pair of tong arms 110a, b, each of which has a first end 120a, b, a second end 130a, b. A substantially cylindrical hinge component 140a, b is provided at the corresponding first end 120a, b of each tong arm 110a, b, and is formed from a structural material. A gripping component 150a, b is provided at the second end 130a, b of each tong arm, and is also formed from the structural material. A handhold 160a, b extends from the hinge component 140a, b to the gripping component 150a, b of each tong arm 110a, b, and the handhold is formed from a handhold material.

The handhold material is a different material than the structural material. Typically, the structural material is a stronger material than the handhold material, and the handhold material provides a better tactile feel for the user. For example, the structural material may be a metal, such as anodized aluminum, and the handhold material may be a wood. The structural material may be harder than the handhold material, and may provide a higher thermal conductivity than the handhold material. As such, the handhold material may insulate a user's hands from heat conducted by the structural material.

In some embodiments, the thermal conductivity of the structural material and the handhold material are similar. In such embodiments, a thermally insulating layer may be provided between the two materials, as discussed in more detail below.

As shown, a substantially linear linking element 170a, b is provided at each tong arm 110a, b, with the linking element extending from each hinge component 140a, b to the corresponding gripping component 150a, b. The linking element 170a, b is formed of the structural material, and may be formed as a single piece with the hinge component 140a, b and the gripping component 150a, b.

As shown, the linking element 170a, b may be exposed at an inner surface of the corresponding arm 110a, b. The inner surface 180a, b of the linking element 170a, b may then be substantially planar, as shown, and may be coextensive with an inner surface 190a, b of the corresponding gripping element 150a, b and an inner surface 200a, b of the handhold 160a, b.

When fully assembly, the hinge component 140a, b of each of the two tong arms 110a, b combine to form a cylindrical hinge 210, discussed in more detail below with respect to FIGS. 7-9.

The gripping components 150a, b of the tongs 100 are each further provided with an outer surface 220a, b. The outer surface 220a, b of each gripping component may be provided such that a linear extension of the corresponding surface is tangent to the cylindrical surface of the corresponding hinge component 140a, b. Further, an outer surface 230a, b of the handhold 160a may be substantially coplanar with the outer surface of the gripping component 220a, b, such that a substantially planar surface extends from the outer surface of the gripping component to the corresponding hinge component 140a, b.

Figure 4:
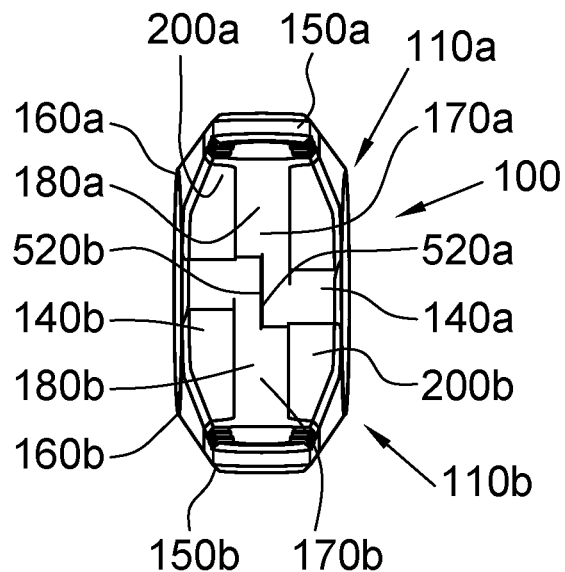
FIG. 4 is a front view of the tongs of FIG. 1.
Figure 5:
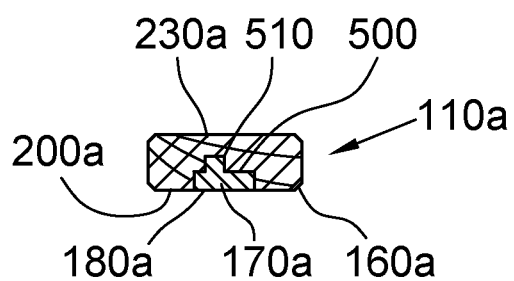
FIG. 5 is a front view of one arm of the tongs of FIG. 1 sectioned along line 5-5 of FIG. 2.
Figure 6:
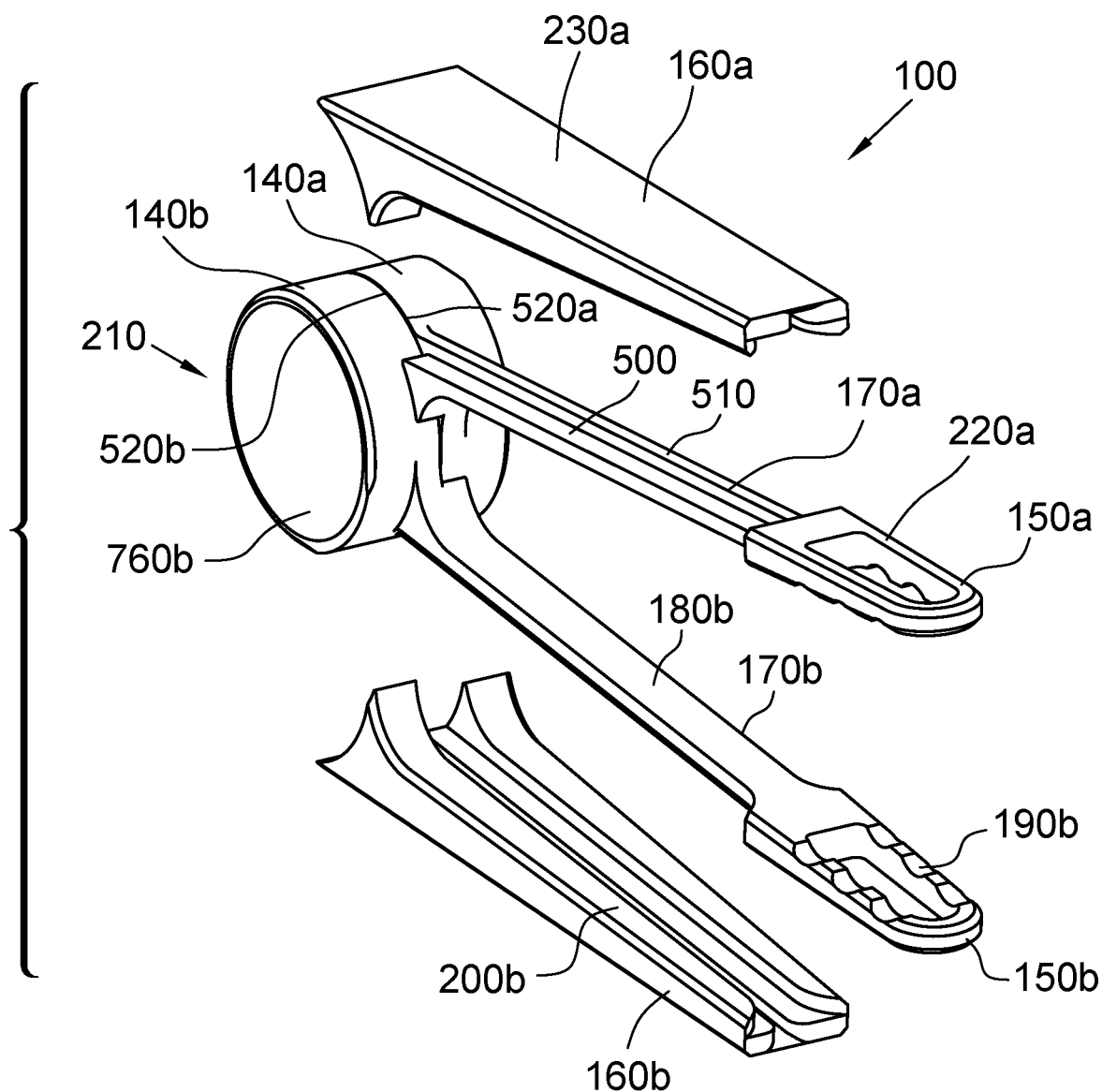
FIG. 6 is an exploded view of the tongs of FIG. 1 with the hinge assembly maintained intact.

FIG. 4 is a front view of the tongs 100 of FIG. 1 and FIG. 5 is a front view of one arm 110a of the tongs 100 of FIG. 1 sectioned along line 5-5 of FIG. 2. FIG. 6 is an exploded view of the tongs 100 of FIG. 1 with the cylindrical hinge assembly 210 maintained intact.

As shown, the linking element 170a, b is surrounded on at least three sides along its length by the corresponding handhold 160a, b. Accordingly, as noted above, the inner surface 180a, b of each linking element 170a, b is exposed, and is substantially coplanar and coextensive with the inner surfaces of the gripping component 190a, b and the handhold 200a, b. The linking element 170a, b is then enclosed by the handhold 160a, b on side surfaces and on its back surface 500.

As shown, the back surface 500 of each linking element 170a, b is substantially planar other than a linear extension 510. The linear extension 510 is raised relative to the back surface 500 and extends along the length of the corresponding linking element 170a, b.

The handhold 160a, b of each tong arm 110a, b may be bonded to the corresponding linking element 170a, b by an adhesive. Accordingly, the back surface 500 and linear extension 510 of each linking element 170a, b may be provided with an adhesive, thereby providing additional surface area for bonding with the handhold 160a, b. Further, the inner surface 200a, b of each handhold 160a, b may be provided with a channel into which the linking element 170a, b fits, and the channel may have a further linear cutout for the corresponding linear extension 510.

In some embodiments, where the thermal conductivity of the handhold 160a, b is similar to that of the linking element 170a, b, due to the materials comprising each having similar thermal conductivity, an additional thermal insulation layer may be provided at the bonding interface, such that the handhold may be insulated from the corresponding linking element.

As shown, the linear extension 510 of each linking element 170a, b is offset relative to the center of the back surface 500 of the corresponding linking element.

As shown more clearly below in FIGS. 7-9, when assembled, the hinge components 140a, b of each of the tong arms 110a, b combine to form a single cylindrical hinge 210. Each hinge component then has an interface surface 520a, b where it interfaces with the hinge component 140a, b of the other tong arm 110a, b. The linking element 170a, b as a whole for each arm 110a, b is then centered relative to a height of the cylindrical hinge, and the linear extension 510 is offset from the center of the back surface 500 of the corresponding linking element.

The linear extension 510 then meets the corresponding hinge component 140a, b directly adjacent the interface surface. Accordingly, the offset of the linear extension is such that one side of the linear extension is located at a centerline of the back surface 500 of the corresponding linking element 170a, b.

Figure 7:
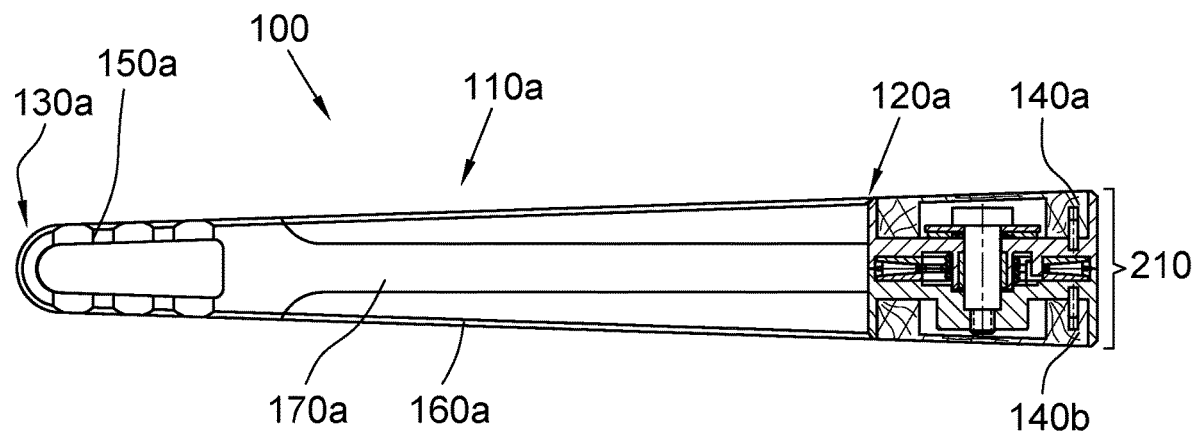
FIG. 7 is a side view of the tongs of FIG. 1 sectioned along line 7-7 of FIG. 2.
Figure 8:
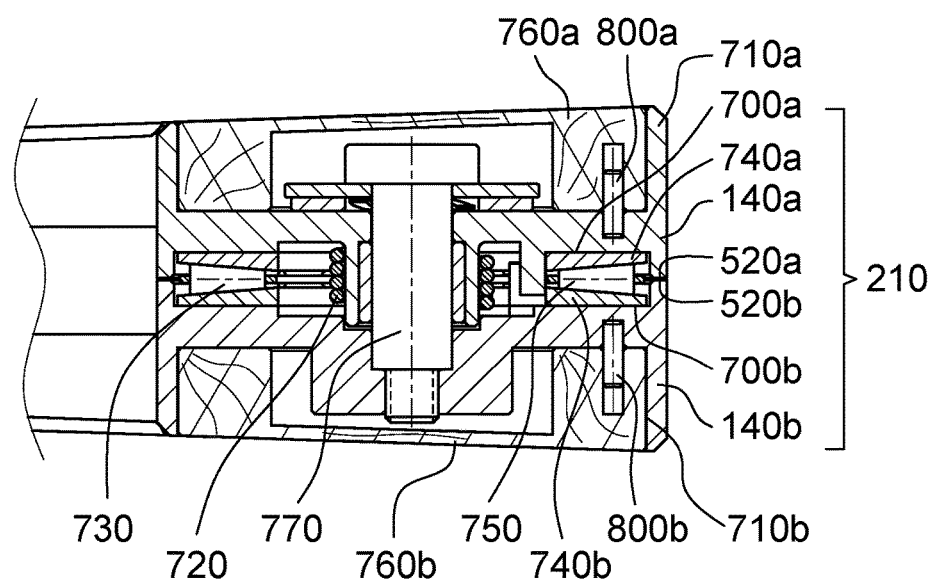
FIG. 8 is an enlarged view of the hinge assembly of FIG. 7 for use in the tongs of FIG. 1.
Figure 9:
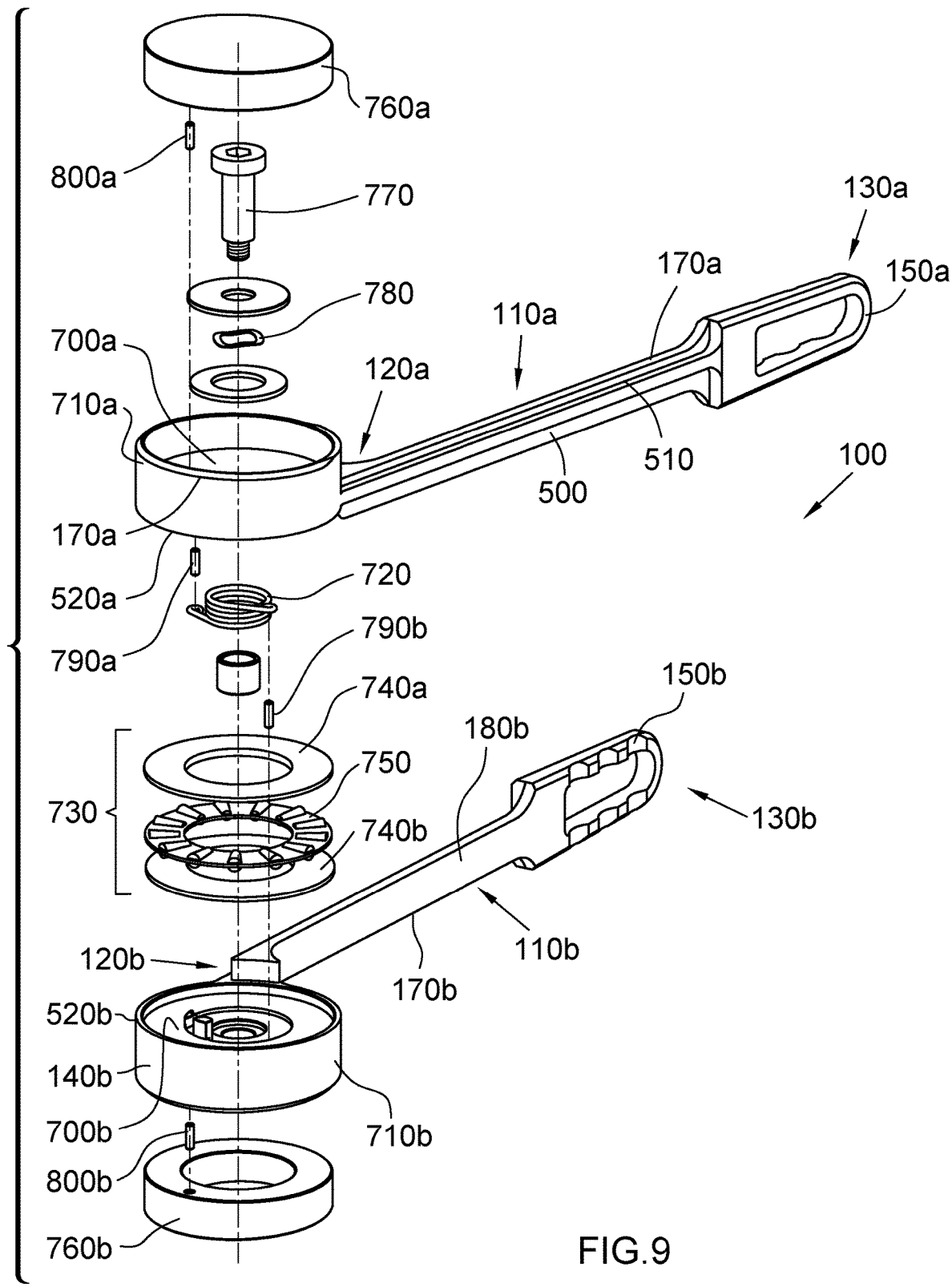
FIG. 9 is an exploded view of the tongs of FIG. 1 with the handholds removed.

FIG. 7 is a side view of the tongs 100 of FIG. 1 sectioned along line 7-7 of FIG. 2 and FIG. 8 is an enlarged view of the hinge assembly 210 of FIG. 7 for use in the tongs of FIG. 1. FIG. 9 is an exploded view of the tongs 100 of FIG. 1 with the handholds 160a, b removed.

As shown, the hinge components 140a, b of each tong arm 110a, b combine to form a cylindrical hinge 210. Each hinge component 140a, b then provides an internal surface 700a, b perpendicular to a cylindrical wall 710a, b of the corresponding hinge component. When assembled, the internal surfaces 700a, b and cylindrical walls 710a, b of each hinge component 140a, b. combine to form an internal chamber within the cylindrical hinge 210.

A hinge assembly is provided within the internal chamber. The hinge assembly includes a biasing spring 720 for biasing the gripping components 150a, b away from each other when the tongs 100 are assembled. The biasing spring 720 is braced at each end against a corresponding biasing pin 790a, b. The hinge assembly further provides a thrust bearing 730 between the internal surfaces 700a, b for rotating the arms 110a, b relative to each other. Accordingly, when assembled, the internal surfaces 700a, b compress the spring assembly such that washers 740a, b enclosing the cage and rolling elements 750 of the thrust bearing are compressed tightly. The biasing spring 720 may then be located at a central shaft opening within the thrust bearing 730. Accordingly, so long as the internal surfaces 700a, b compress the hinge assembly, the tong arms 110a, b rotate relative to each other with little play, and the gripping components 150a, b are biased away from each other and the tongs 100 would not stick in a closed position.

Each hinge component 140a, b may be further provided with a corresponding end cap 760a, b. The end caps 760a, b may be formed from the handhold material, thereby visually connecting the end caps to the handholds 160a, b and providing a coherent visual aesthetic. The end caps 760a, b may then form opposing bases of the cylindrical hinge 210 when assembled.

As shown, the end caps 760a, b may enclose a pin 770 which passes through the central shaft opening of the thrust bearing 730 and may similarly pass through the coil of the biasing spring 720 and thereby force the internal surfaces 700a, b together. The pin 770 may be opposed by a wave spring 780 in order to regulate the force applied by the pin. Ideally, enough force is applied by the pin 770 such that any play or gap between the hinge components 140a, b is eliminated.

In some embodiments, the cylindrical hinge 210 forms a right cylinder, such that the end caps 760a, b form bases at right angles relative to the cylindrical walls 710a, b of the corresponding hinge components 140a, b. Alternatively, as shown, the end caps 760a, b or the hinge components 140a, b themselves, or both, may be tapered towards the tong arms 110a, b at an angle relative to a central plane of the tongs 100. Further, a width of each tong arm 110a, b may be similarly tapered along a length at the same angle relative to the central plane, such that each tong arm forms a truncated wedge with the cylindrical hinge. A hypothetical point of such a truncated wedge would extend beyond the second end 130a, b and gripping component 140a, b of the corresponding tong arm 110a, b. Such a truncated wedge is shown, for example, in FIG. 3. In order to preserve the tapered aesthetic, the end caps 760a, b are fixed by end cap pins 800a, b which prevent any rotation of the corresponding end caps.

Further, as shown in FIG. 2, the tongs 100, or the tong arms 110a, b may be tapered along other dimensions as well. The thickness of each tong arm 110a, b shown is tapered along its length, such that the handhold 160a, b is tapered towards the corresponding gripping component 150a, b, and the gripping component itself is tapered.

Additional features of the tongs 100 are visible in the drawings. For example, the inner surface 190a, b of each gripping component 150a, b may be hardened and textured so as to improve a grip that can be applied using the tongs.

As discussed above, the handhold material typically has a lower thermal conductivity than the structural material. The structural material may therefore be aluminum, such as anodized aluminum, while the handhold material may be formed of wood. Anodizing the aluminum structural material may provide hardness levels ranging from 55-70 Rockwell C, and protects the aluminum from high surface temperatures.

The handhold material may similarly be acrylic, acetate, metals different than those used for the structural material, as well as stone or glass, among other materials. Other high temperature plastics may be provided as well. Typically, if the handhold material is a metal, a thermal insulator would be provided at the adhesive interface between the handhold 170a, b and the corresponding linking element 170a, b.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. Tongs comprising:
   a pair of tong arms each having a first end and a second end, each tong arm comprising:
      a substantially cylindrical hinge component at the first end formed from a structural material;
      a gripping component at the second end formed from the structural material;
      a handhold extending from the hinge component to the gripping component formed from a handhold material; and
      a substantially linear linking element extending from the hinge component to the gripping component of the corresponding tong arm and formed from the structural material,
   wherein the structural material is stronger than the handhold material, and wherein the linking element is surrounded on at least three sides along its length by the handhold.

2. The tongs of claim 1, wherein the handhold is bonded to the linking element by an adhesive.

3. The tongs of claim 2, wherein the linking element is exposed at an inner surface of the corresponding arm, and wherein an inner surface of the linking element is substantially planar and coextensive with an inner surface of the gripping component and an inner surface of the handhold.

4. The tongs of claim 2, wherein the linking element is exposed on an inner surface of the tong arm and is enclosed on side surfaces and a back surface by the handhold.

5. The tongs of claim 4, wherein the back surface of the linking element is substantially planar other than a linear extension, and the linear extension is raised relative to the back surface, the linear extension extending along the length of the linking element.

6. The tongs of claim 5, wherein the adhesive is bonded to surfaces of the linear extension.

7. The tongs of claim 5, wherein the linear extension is offset from a center on the back surface of the linking element along the length of the linking element.

8. The tongs of claim 7, wherein the hinge components of each of the first and second arms combine to form a cylindrical hinge, with each hinge component having an interface surface where it interfaces with the hinge component of the other of the first and second arms, and wherein the linking element of each arm is centered relative to a height of the cylindrical hinge, and wherein the linear extension is offset from the center of the back surface of the corresponding linking element such that the linear extension meets the corresponding hinge component adjacent the interface surface.

9. The tongs of claim 1, wherein the gripping component has an outer surface, and wherein a linear extension of the outer surface of the gripping component is tangent to the cylindrical surface of the corresponding hinge component, and wherein an outer surface of the handhold is substantially coplanar with the outer surface of the gripping component.

10. The tongs of claim 1, wherein the hinge components of each of the first and second arms combine to form a cylindrical hinge, and wherein the cylindrical hinge further comprises:
    an internal surface within each hinge component perpendicular to a cylindrical wall of the corresponding hinge component, wherein, when assembled, the internal surfaces and cylindrical walls of the hinge components form an internal chamber within the cylindrical hinge;
    a biasing spring for biasing the gripping components away from each other; and
    a thrust bearing compressed between the internal surfaces for rotating the arms relative to each other.

11. The pair of tongs of claim 10, wherein each hinge component is provided with a corresponding end cap formed from the handhold material, and wherein the end caps form opposing bases of the cylindrical hinge when assembled.

12. The pair of tongs of claim 10, wherein opposing bases of the cylindrical hinge are tapered towards the tong arms at an angle relative to a central plane of the tongs, and wherein a width of each tong arm is tapered along a length of the corresponding tong arm at the same angle relative to the central plane, such that each tong arm forms a truncated wedge with the cylindrical hinge and with a point extending beyond the second end of the tong arm.

13. The pair of tongs of claim 1, wherein the handhold material has lower thermal conductivity than the structural material.

14. The pair of tongs of claim 13, wherein the structural material is harder than the handhold material.

15. The pair of tongs of claim 1, wherein the structural material is metal, and wherein the handhold material is wood.

16. The pair of tongs of claim 15, wherein the structural material is anodized aluminum.

* * * * *